(12) United States Patent
Voorhees et al.

(10) Patent No.: US 9,626,069 B2
(45) Date of Patent: Apr. 18, 2017

(54) VIEW LOCKING MULTI-MONITOR SCREEN MAGNIFIER

(75) Inventors: Garald Lee Voorhees, Tampa, FL (US); Glen Gordon, Madison, WI (US); Eric Damery, Odessa, FL (US); Daniel Simkovitz, Brookline, MA (US)

(73) Assignee: Freedom Scientific, Inc., St. Petersburg, FL (US)

( * ) Notice: Subject to any disclaimer, the term of this patent is extended or adjusted under 35 U.S.C. 154(b) by 51 days.

(21) Appl. No.: 13/952,383

(22) PCT Filed: Jan. 3, 2012

(86) PCT No.: PCT/US2012/020044
§ 371 (c)(1),
(2), (4) Date: Oct. 27, 2016

(87) PCT Pub. No.: WO2012/094295
PCT Pub. Date: Jul. 12, 2012

(65) Prior Publication Data
US 2015/0033183 A1    Jan. 29, 2015

Related U.S. Application Data

(60) Provisional application No. 61/429,303, filed on Jan. 3, 2011.

(51) Int. Cl.
*G06F 3/0481* (2013.01)

(52) U.S. Cl.
CPC .. *G06F 3/0481* (2013.01); *G06F 2203/04805* (2013.01)

(58) Field of Classification Search
CPC ....... G06F 3/04812; G06F 2203/04805; G06F 2203/04806; G06F 3/0481; G06F 3/04892
(Continued)

(56) References Cited

U.S. PATENT DOCUMENTS 7,870,496 B1 * 1/2011 Sherwani ............... 715/761
8,276,085 B2 * 9/2012 Sherwani ............... 715/761
(Continued)

FOREIGN PATENT DOCUMENTS

KR    20000036836 A    7/2000
KR    20040057131 A    7/2004
(Continued)

OTHER PUBLICATIONS

International Search Report for PCT/US2012/020044 filed on Jan. 3, 2012, with a mailing date of Jul. 31, 2012.
(Continued)

*Primary Examiner* — Namitha Pilla
(74) *Attorney, Agent, or Firm* — Anton J. Hopen; Andriy Lytvyn; Smith & Hopen, P.A.

(57) ABSTRACT

A method of locking magnified screen views including the steps of magnifying a portion of a graphic user interface on a first monitor to establish a first magnified view having upper, lower, left and right boundaries, magnifying a portion of the graphic user interface on a second monitor to establish a second magnified view having upper, lower, left and right boundaries, whereby the graphic user interface of the first monitor is extended in the direction of the second monitor, responsive to an end-user selectable setting, restricting pointer indicia movement to an area defined by the boundaries of each view that are not between first and second monitor, and responsive to pointer indicia moving from first monitor towards second monitor displaying pointer indicia within second magnified view responsive to pointer indicia crossing the boundary of first magnified view in the direction of second monitor.

4 Claims, 14 Drawing Sheets

(58) Field of Classification Search
USPC .................................. 715/761, 778; 345/676
See application file for complete search history.

(56) References Cited

U.S. PATENT DOCUMENTS

| | | | |
|---|---|---|---|
| 2006/0136836 A1* | 6/2006 | Clee et al. .................... | 715/781 |
| 2008/0070684 A1* | 3/2008 | Haigh-Hutchinson . | A63F 13/04 463/32 |
| 2010/0070912 A1* | 3/2010 | Zaman .................. | G06F 3/0481 715/784 |
| 2010/0235736 A1* | 9/2010 | Fleisher et al. ............... | 715/702 |
| 2011/0093822 A1* | 4/2011 | Sherwani ...................... | 715/863 |
| 2011/0314144 A1* | 12/2011 | Goodman .............. | G06Q 10/06 709/224 |

FOREIGN PATENT DOCUMENTS

| | | | | |
|---|---|---|---|---|
| KR | 20080023724 A | 3/2008 | | |
| KR | 20090035264 A | 4/2009 | | |
| WO | WO 2012094295 A3 * | 7/2012 | ............... | G06F 3/00 |

OTHER PUBLICATIONS

International Preliminary Report on Patentability for PCT/US2012/020044 filed on Jan. 3, 2012, with a mailing date of Jul. 31, 2012.

* cited by examiner

*Prior Art*

120

120

120

VIEW LOCKING MULTI-MONITOR SCREEN MAGNIFIER

CROSS-REFERENCE TO RELATED APPLICATIONS

This application is a continuation of PCT Patent Application No. PCT/US2012/020044, entitled "View Locking Multi-Monitor Screen Magnifier," filed Jan. 3, 2012, which claims the benefit of U.S. provisional patent application No. 61/429,303, filed on Jan. 3, 2011, also entitled, "View Locking Multi-Monitor Screen Magnifier".

BACKGROUND

1. Field of the Invention

This invention relates to screen magnification software and, more specifically, to a feature to lock a magnified view.

2. Background of the Invention

Screen magnification software generally comprises a software application loaded on a personal computer by optical disc or by download from the Internet. The software runs at a low level, frequently intercepting internal messaging at the operating system level and even to graphic display drivers. Magnification software, to be effective, must be available across the entire operating system and not just be limited to a specific application.

While screen magnification products provide access to the entire desktop area, users only have visual access to a portion of the desktop area at any given time because, for example, with items magnified at 2× magnification the user sees one fourth of the original screen, and at 4× magnification, the user sees one sixteenth of the original screen.

During typical functionality, as the user moves the mouse around the screen, the magnified viewing area tracks the movement of the mouse, allowing the user to have visual access to the desktop area around the mouse location. There are, however, times when it would be advantageous to restrict the movement of the mouse to the current magnified view. One example of this is when the user needs to access two pieces of information that are spread apart, but could fit into the magnified viewing area except that the movement of the mouse continually pushes the information on one side of the desktop off the screen as the user approaches the information on the other side of the desktop. The user may wish to keep the magnified view stationary while moving the mouse to avoid unintended view changes. When using screen magnification with a single monitor, it is important that the mouse is restricted to the magnified area during this view locking mode. Otherwise, the mouse will either move outside the boundaries of the magnified area or will cause the magnification area to pan in the direction of the mouse movement.

When using screen magnification in a multi-monitor setting, the need to be able to lock the current view becomes even more important since the user needs to be able to visually access information in each monitor simultaneously. However, the user also may need to be able to freely move the mouse between the monitors while keeping the viewing area static in each monitor. If the user moves the mouse to the edge of the viewing area on one monitor, in the direction of another monitor, the mouse needs to flow to the other monitor without changing the views in either monitor. However, if the user moves the mouse to the edge of the viewing area on a side that does not have another monitor, the mouse needs to be bound to the viewing area, just as it is in the single monitor scenario.

SUMMARY OF INVENTION

A view locking feature locks the mouse to the current viewing area in single monitor while keeping the mouse in view, allowing it to be moved freely within the limits of a stationary background. Furthermore, this feature provides additional functionality for moving smoothly between monitors in a multi-monitor setting by allowing the user to move the mouse from an application on one monitor to an application on the other monitor while circumventing the undesired behavior of shifting the view in either monitor. The magnified views will stay stationary and the mouse will go directly from one application view to the other when a keystroke combination is pressed in conjunction with mouse movement.

Another feature of the present invention is a view predictor function. The predictor function identifies the first area of interest of a low vision user when the screen is magnified. For example, if a user invokes 4× screen magnification then always moves to a login textbox on a form, then the present invention will recall this. When the low vision user invokes the 4× screen magnification for the same application in the same state it will automatically set the view to the login textbox because it will assume from past low vision user interaction that such a view is the most useful to initiate with. The predictor function may resolve the initial view by identifying the first control object the user engages. Going back to the example, if the low vision user enters in keystrokes into the login textbox then the textbox control itself will be put at the center of the view automatically upon magnification. This method may also be used to set the focus of the control as well. The predictor function may save the state of the document, reference, object, and user interactions by a number of means including, but not limited to session state, cookies, configuration files (e.g., INI, XML or the like), and/or databases.

In another example, the low vision user opens up a bank statement report on a web browser and moves to the upper right of the report initially to read the account totals. The user typically spends about five (5) seconds at this screen position or view before panning to other areas of the report (as it is magnified by the screen magnification software). The view predictor function in this case stores the Cartesian coordinates of the view where the user moves to and then idles for a preset period of time (i.e., five seconds). Thus, the view predictor function in this example subsequently sets a view automatically even though the lower vision user was only reading screen contents and not interacting with an interface control object. An advantage of the view predictor function is that the screen view upon magnification is not arbitrarily set for the low vision user. Rather, the view is set dynamically based upon the past interactions of the low vision user so the user can immediately start interacting with the magnified interface without having to pan to an area of initial interest repeatedly.

In yet another embodiment of the invention, the end user may bookmark a plurality of views which may be accessed in sequence or out of sequence. For example, a user may initially need to view a login textbox to access an online banking system. That is view #1. Once logged in, the user may want to view the upper right of a bank statement report which is view #2. Finally, view #3 may be focused on a bill payment control. The present invention may sequentially move back and forth between view #1, #2 and #3 responsive to user initiated events (i.e., logging in and being authenticated by the online banking site). In addition, views may be presented in sequence by a wait loop for each view. For example, view #2 only requires five (5) seconds for the low vision end user to review the banking account totals after which end user almost always goes directly to view #3 to pay bills. View #2 can be presented for five (5) seconds before the present invention either pans or jumps to view #3 based on the end user's manual preferences or the background monitoring of the end user's pattern of interaction with the graphic user interface. The end user may step backwards or forwards manually via a keystroke, mouse action, voice command or the like.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
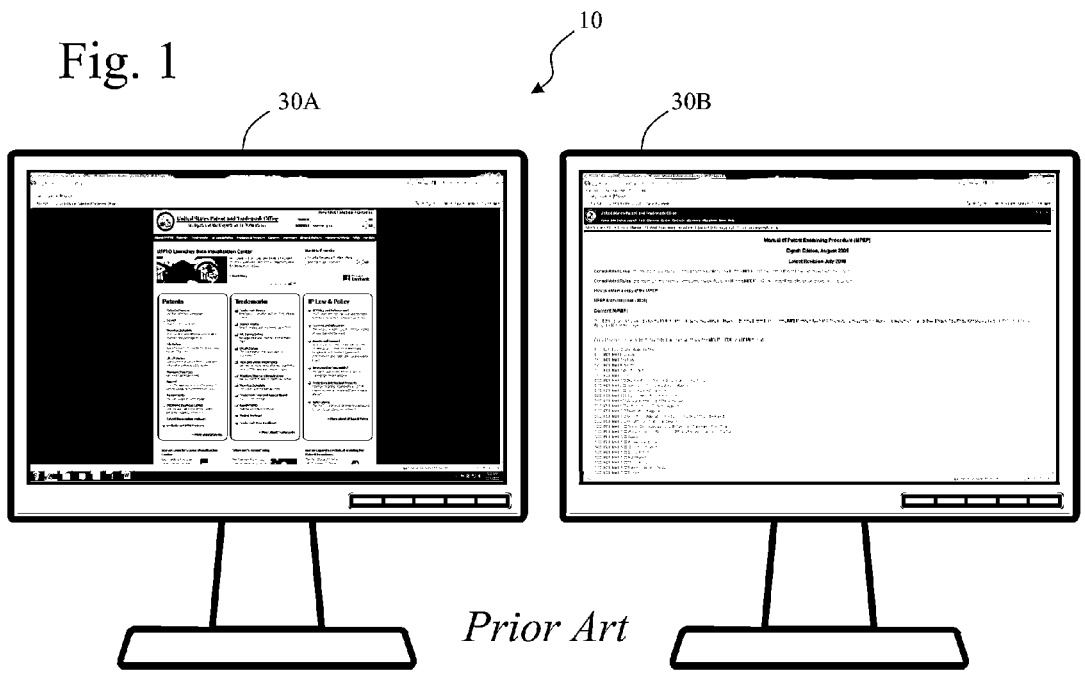
FIG. 1 is a representative view of a dual monitor system at 1× magnification.
Figure 2:
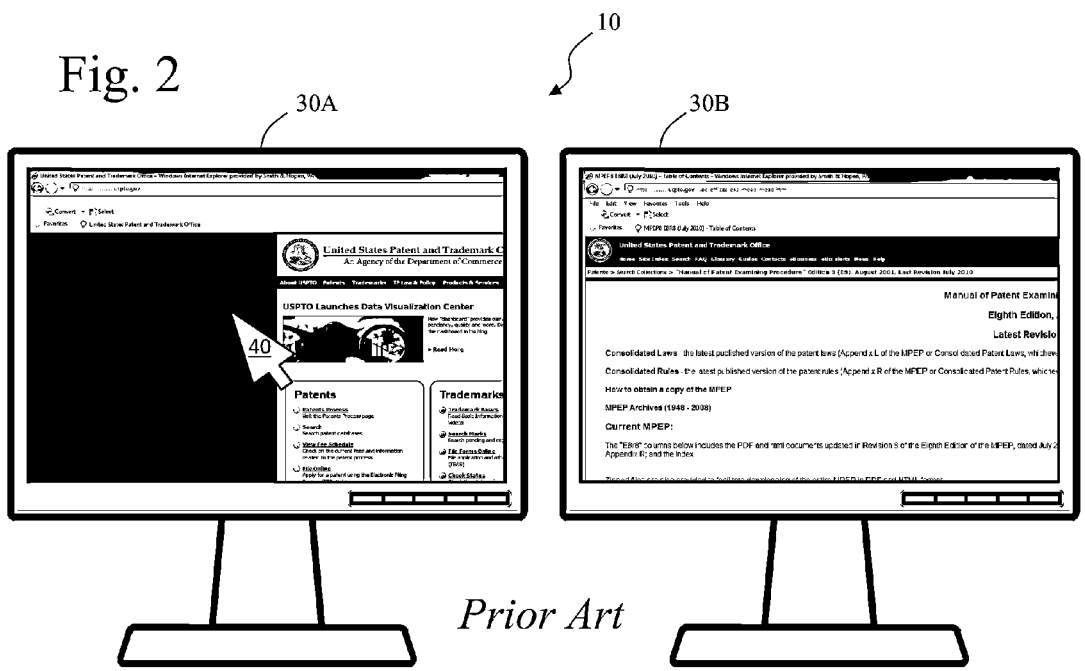
FIG. 2 is a first view in a sequence of five representative views of a dual monitor system at 2× magnification according to the prior art.
Figure 3:
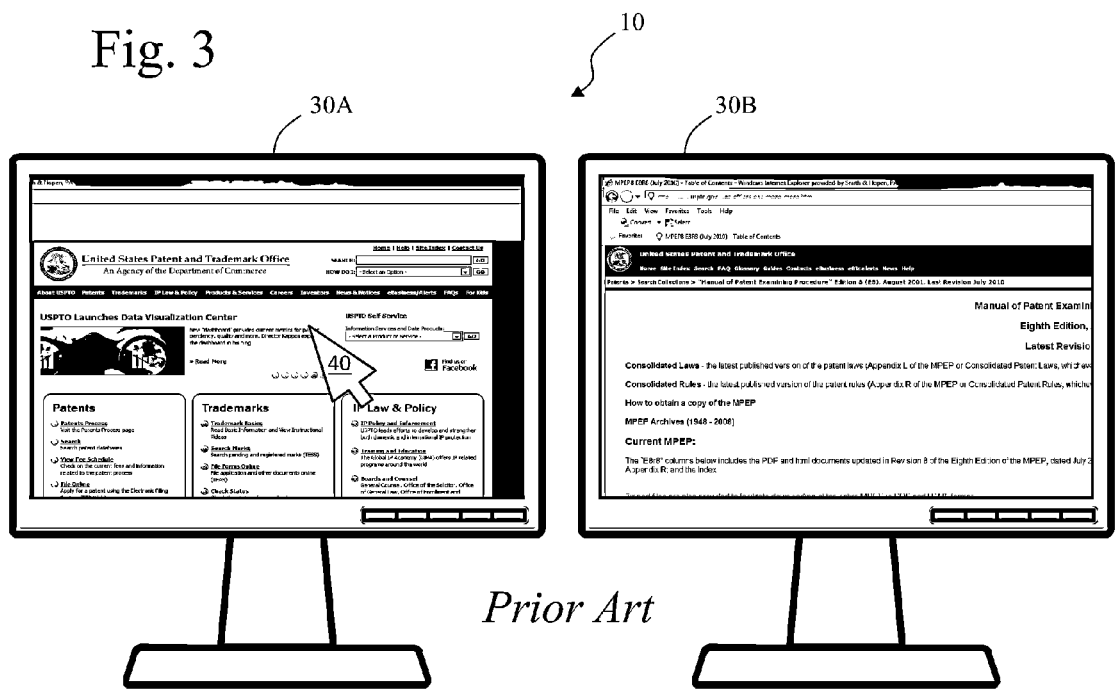
FIG. 3 is a second view in a sequence of five representative views of a dual monitor system at 2× magnification showing the mouse pointer being placed near the center of a browser window in the left monitor.

Turning to FIG. 1, dual monitor system 10 is represented having left monitor 30A and right monitor 30B displaying an extended desktop with two separate web browser windows. In FIG. 2, screen magnification software zooms each monitor to 2× magnification. Mouse 40 is shown over a 2× magnified view in left monitor 30A. In FIG. 3, end user moves mouse 40 towards the center of a web browser in left monitor 30A and for the purposes of this discussion, this first view is what end user wants to maintain.

Figure 4:
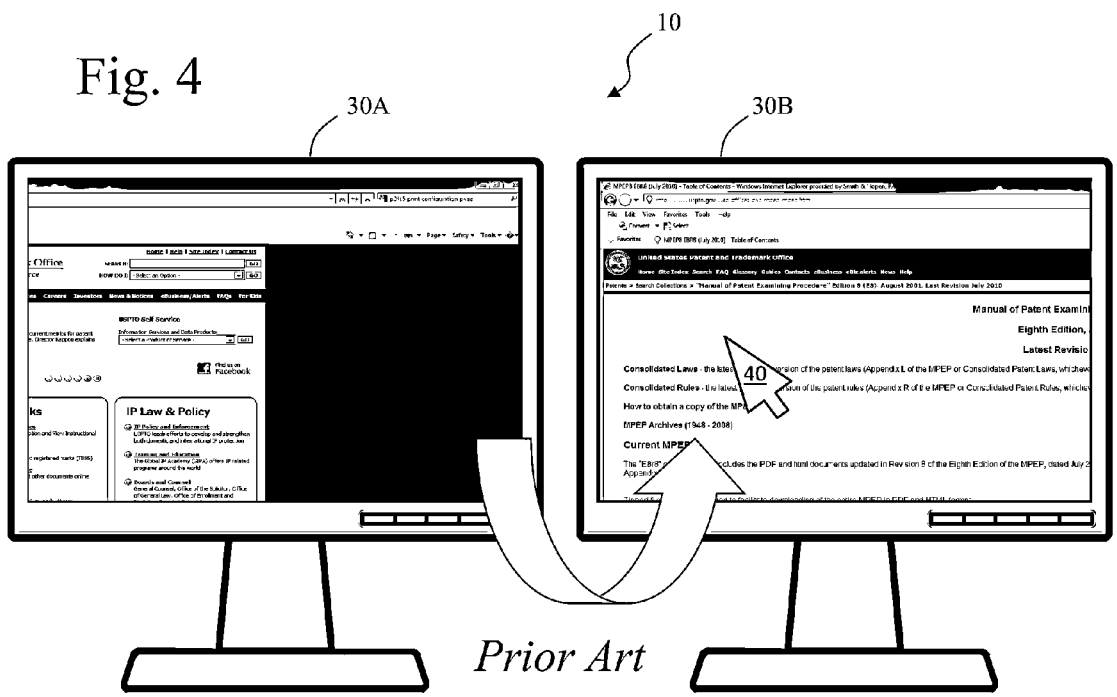
FIG. 4 is a third view in a sequence of five representative views of a dual monitor system at 2× magnification showing the mouse pointer being shifted from the left monitor over to the right monitor.
Figure 5:
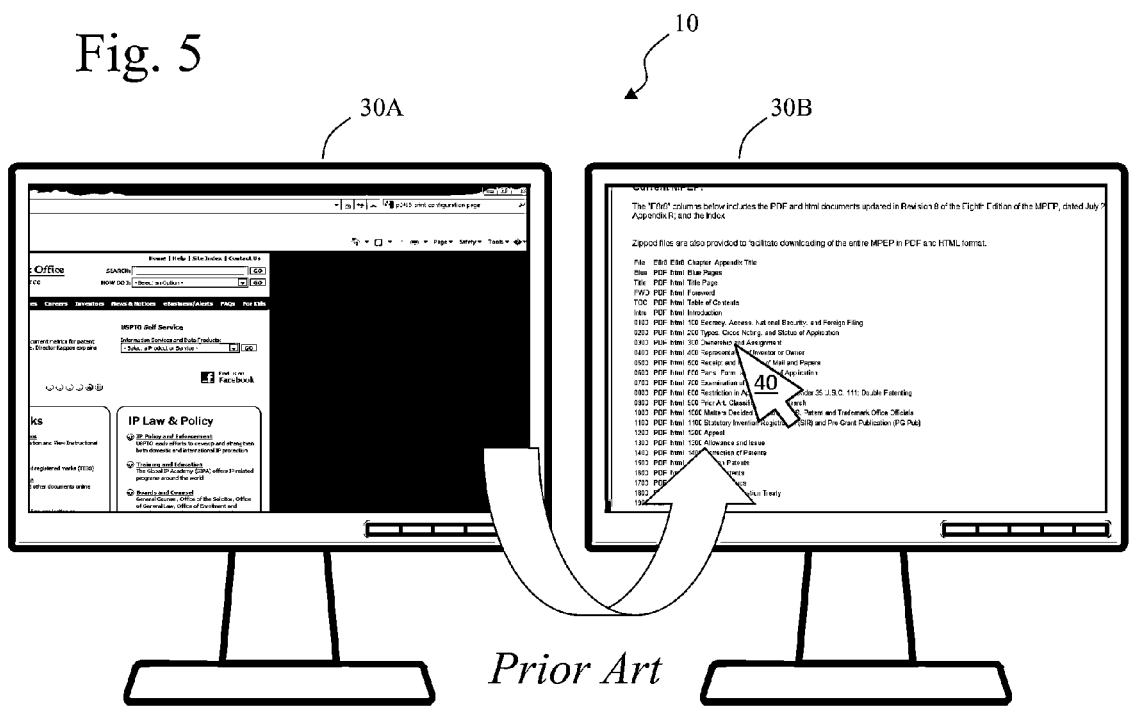
FIG. 5 is a fourth view in a sequence of five representative views of a dual monitor system at 2× magnification showing the mouse pointer being moved downward on the right monitor.
Figure 6:
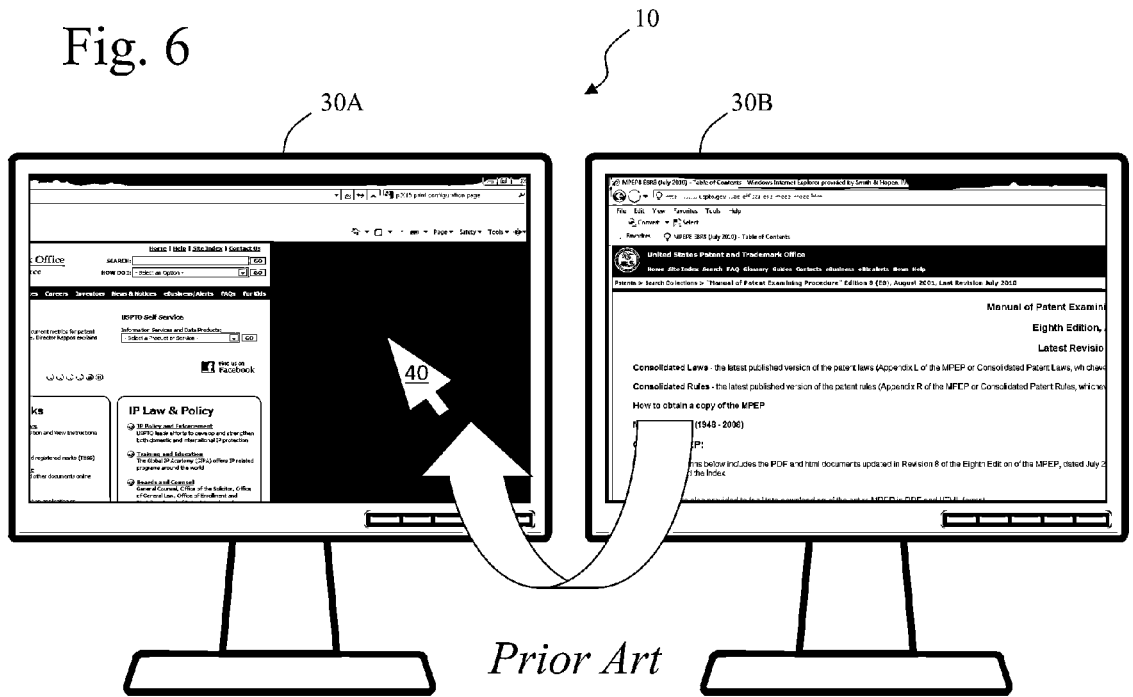
FIG. 6 is a fifth view in the sequence of five representative views of a dual monitor system at 2× magnification showing the mouse pointer being shifted over to the left monitor.

In FIG. 4, end user wishes to move mouse 40 to right monitor 30B. However, in doing so, end user loses first view in left monitor 30A as the movement of the mouse scrolls the zoomed-in desktop canvas in left monitor 30A away from first view towards the right side of the screen. When mouse 40 arrives at the left edge of left monitor 30B it will always be at the left side of the desktop canvas of right monitor 30B. In FIG. 5, end user moves mouse 40 downward to second view in right monitor 30B. Second view is the area of interest for end user in right monitor 30B and first view is the area of interest for end user in left monitor 30A. However, for end user to return to left monitor 30A by sweeping mouse leftwards, both first and second views are lost as shown in FIG. 6 wherein mouse 40 movement from one monitor to another pans the view to a virtual boundary between monitors. The virtual boundary is the Cartesian coordinates wherein the mouse disappears from one monitor and reappears instantly on the other. This is unproductive and frustrating to the low vision user.

Figure 7:
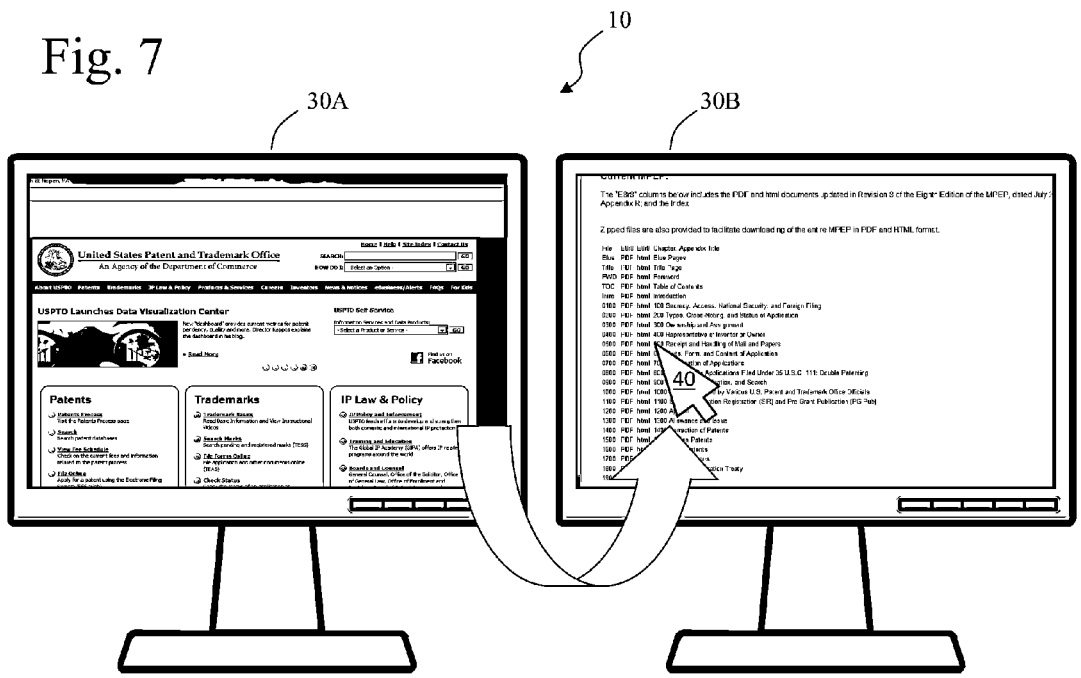
FIG. 7 is a representative view of a dual monitor system at 2× magnification wherein mouse indicia in a first magnified view on the left monitor instantly jumps into a second magnified view on the right monitor.
Figure 8:
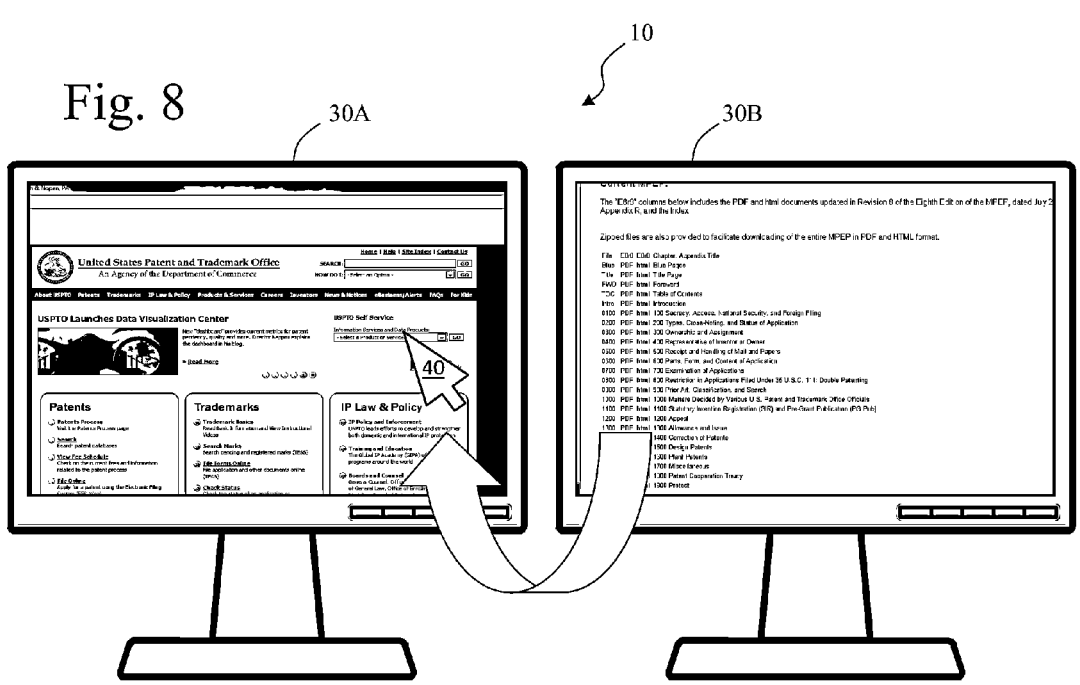
FIG. 8 is a representative view of a dual monitor system at 2× magnification wherein mouse indicia in the second magnified view on the right monitor instantly jumps back into the first magnified view on the left monitor.

An embodiment of the present invention is shown in FIGS. 7-10. In FIG. 7, left monitor 30A is set to first view. When mouse 40 hits the right edge of first view mouse 40 instantly jumps into second view. In contradistinction to FIG. 4, first view did not scroll off-screen to the left in response. In FIG. 8, mouse 40 is swept leftwards from right monitor 30B towards left monitor 30A from second view. Second view in maintained in right monitor 30B and when mouse 40 hits the left edge of second view (in the direction of left monitor 30A) mouse 40 instantly jumps back into first view on left monitor 30A. This is achieved by the screen magnification software storing and retrieving variables defining the views.

Figure 9:
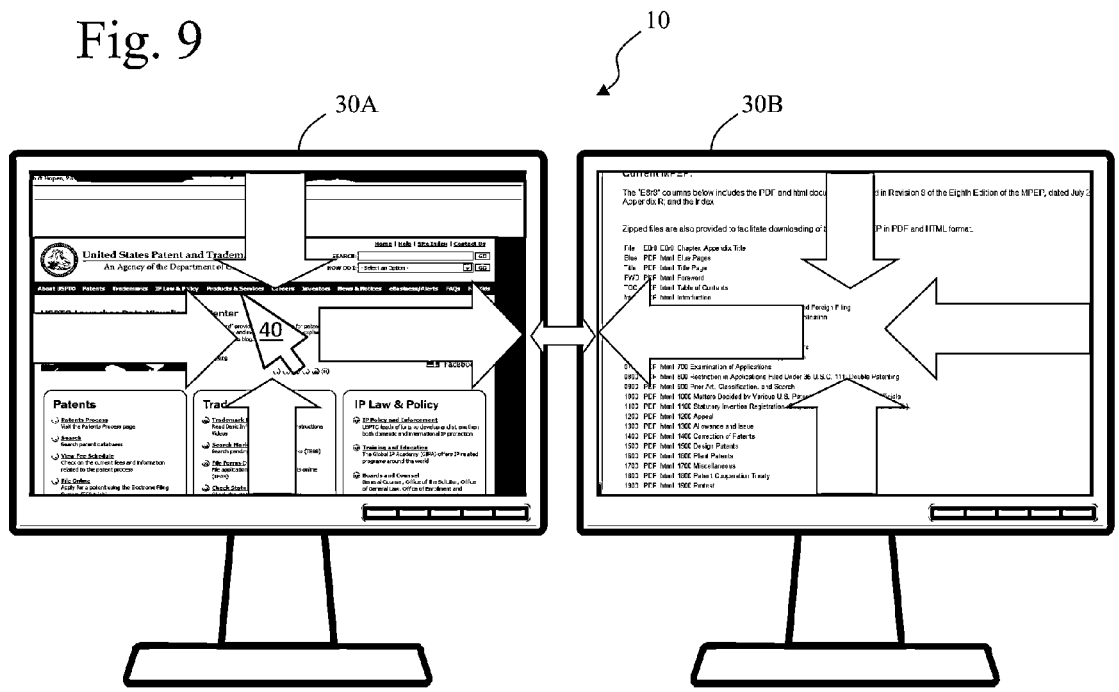
FIG. 9 is a representative view of a dual monitor system at 2× magnification showing restrictions on mouse movement when view locking is active.

FIG. 9 illustrates mouse 40 movement restrictions when view locking is enabled. When view locking is enabled, mouse movement is restricted to the boundaries of the preselected view. Otherwise, the mouse would either go outside the boundaries of the view (and its location lost) or the mouse would pan the magnified area of the graphic user interface away from the user's area of interest. Left monitor 30A is locked to first view and mouse 40 is restricted from moving beyond the upper, left and lower boundaries of first view. However, because the desktop is extended to right monitor 30B, mouse 40 is not restricted from movement beyond the right boundary of first view. When mouse 40 crosses the right boundary of first view mouse 40 instantly jumps into second view on right monitor 30B. When locking is enabled in second view (on right monitor 30B) then mouse 40 movement is restricted at the upper, right and lower boundaries of second view but not on the left boundary. Different regions in each monitor are "locked" to the preferred view in their respective monitor and the end user can flow between the two viewing areas (regions) without having to traverse desktop area that would otherwise lie between the views. This allows the user to quickly move between one application and another without losing focus or performing additional navigation. This is particularly useful in selecting and pasting text and other data between two or more separate software applications.

Returning to FIG. 9, crossing left boundary of second view will cause mouse 40 to instantly return to first view on left monitor 30A. It should be noted that the present invention is not limited to two monitors but may be logically extended to more monitors. For example, if three monitors are arranged side-by-side, then a locked view in the middle monitor might only restrict mouse movement on the upper and lower boundaries of that view since the mouse could sweep to the left monitor or right monitor in such a configuration.

It should also be noted that when mouse 40 jumps into a new view an embodiment of the invention places focus on whatever control or application exists directly underneath mouse's location. This is a preference that can be set by the user. For example, a fillable form is in focus in a first monitor and a person's birth certificate is in a second monitor. The end user wishes to type data into the fillable form but also needs to expose areas on the birth certificate not currently in the magnified view. It would be most efficient to maintain focus in the fillable form but also be able to track mouse movement to change the view in second monitor so that various data fields on the birth certificate can be viewed. In this instance, the software application would not automatically change focus to the control or application directly underneath mouse 40 location because the user wants focus to remain in the fillable form. Alternatively, if a user was copying and pasting between two applications, each on separate monitors, having the focus automatically forced underneath mouse 40 location when switching between monitors would be preferable since the user will copy text from the first application and then paste it into the second application (i.e., focus is needed to obtain and deliver data to and from the clipboard).

Moving the mouse between one monitor to another and then forcing focus on the application or control underneath may be invoked by standard Windows calls to and from the application programming interface (API). Standard Windows API calls are used to determine which application is underneath the mouse and also to force focus into that application. Another feature is to automatically bring an application into focus without moving the application's cursor. For example, if data is cut and pasted between a word processing document on a first monitor and a spreadsheet on a second monitor, it may be preferable when bringing the word processing application into focus to maintain the previous location of the cursor in the document.

Figure 10:
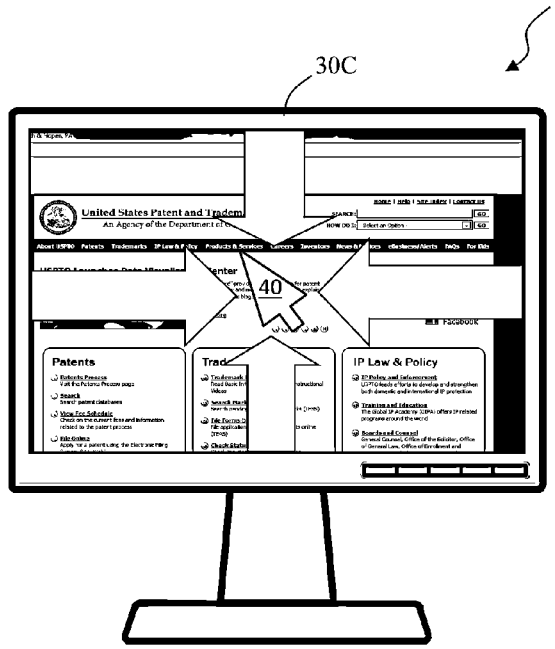
FIG. 10 is a representative view of a single monitor system at 2× magnification showing restrictions on mouse movement when view locking is active.

FIG. 10 illustrates the operation of the present invention with a single monitor 30C. An end user might want to lock a magnified view in single monitor 30C so that if mouse 40 accidentally moves beyond on the upper, left, lower or right boundaries of the view then the view is not lost by scrolling of the magnified desktop canvas.

Figure 11:
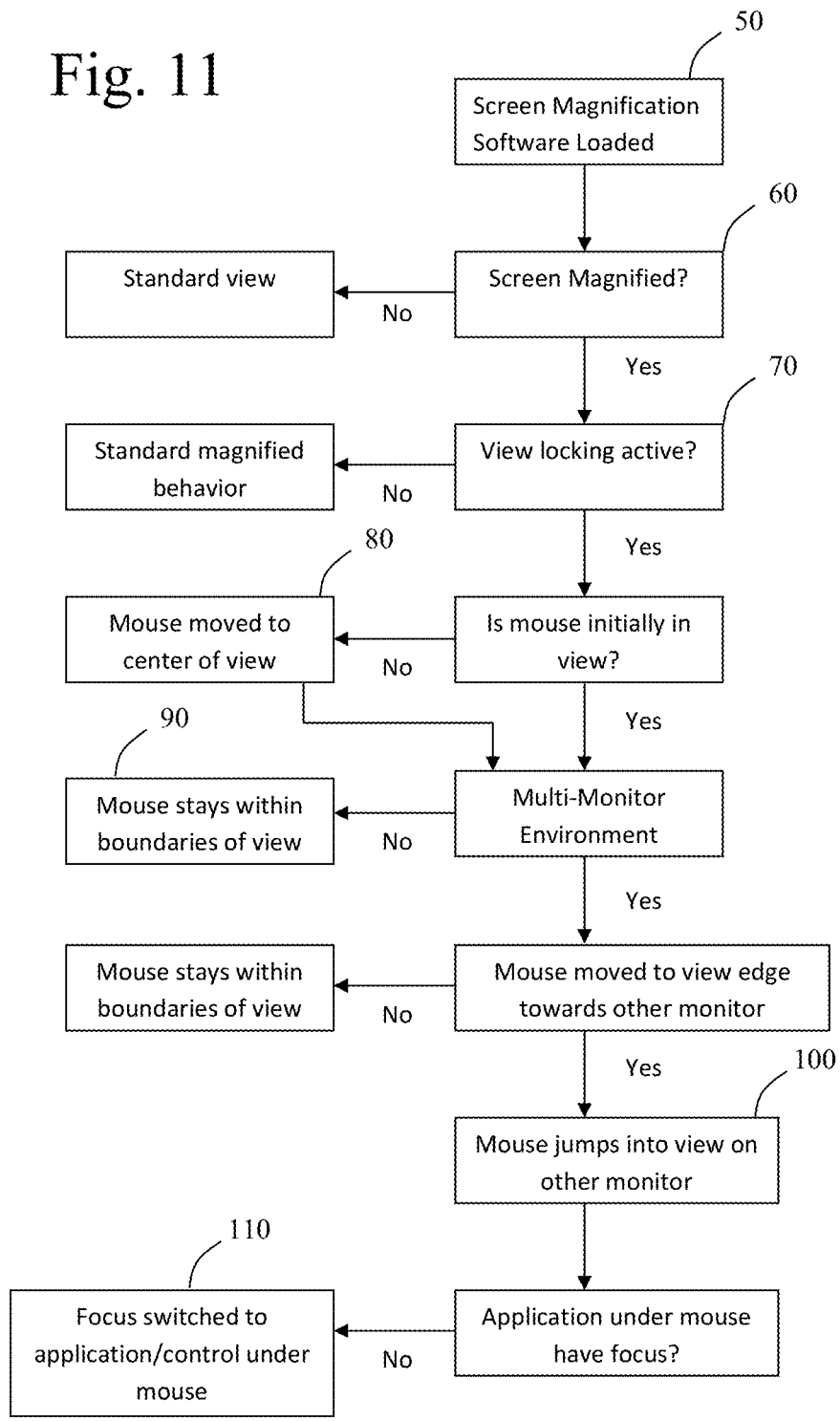
FIG. 11 is a diagrammatic view of a logical process according to an embodiment of the invention.

An embodiment of the invention is shown in logical steps in FIG. 11 wherein the screen magnification software is loaded 50 onto a computer. The software contains instructions on a computer-readable medium which provide instructions to a computer processor. In all embodiments of the invention, the behavior of the screen locking feature transforms the display and thus enhances the usability of the screen reader software. The screen is magnified 60 and view locking is enabled 70. If mouse 40 is out of view upon view locking 70 then mouse is moved 80 to the center of the view. If single monitor exists 90 then mouse stays within the boundaries of the view on all four sides. In a multi-monitor environment, mouse 40 jumps into view 100 on the other monitor. Applications and controls under mouse 40 that has entered a view are given focus 110.

Figure 12:
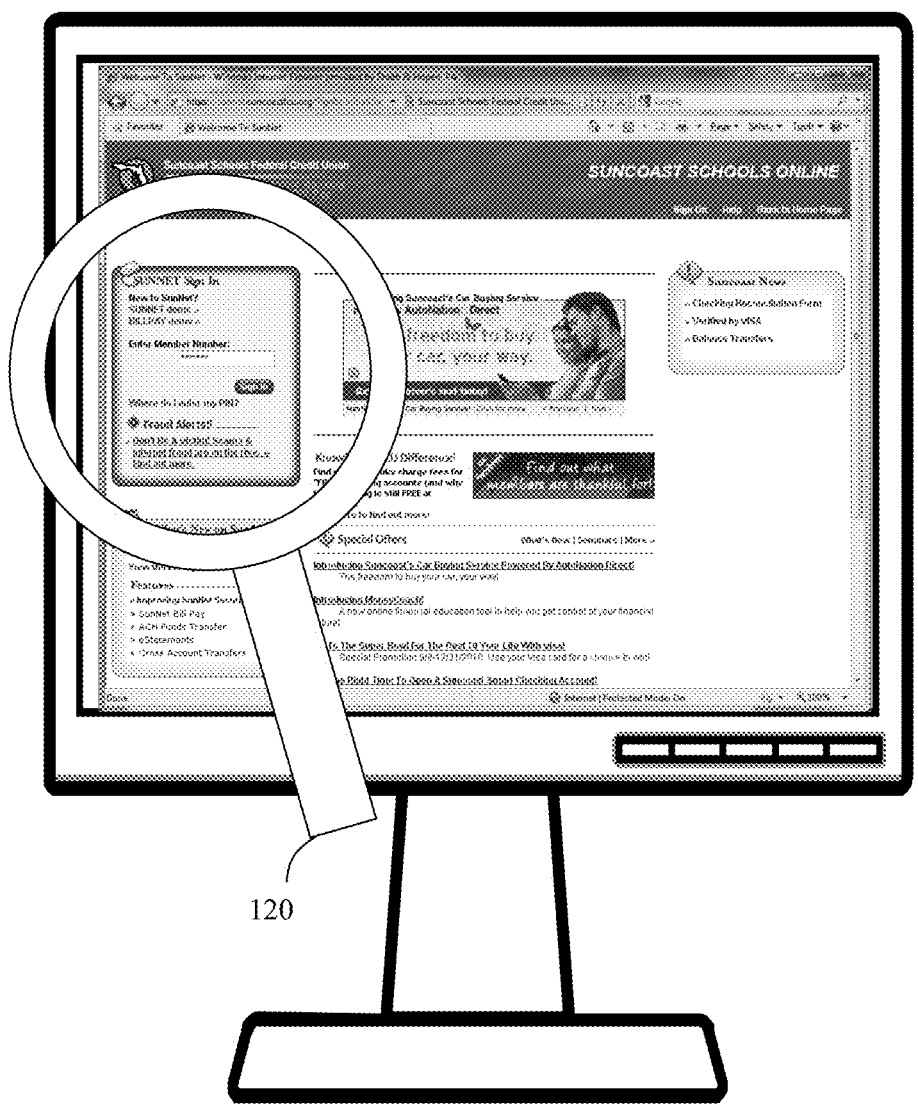
FIG. 12 is a first view in a sequence of two representative views of a predictive view function according to an embodiment of the invention, an unmagnified browser window is shown with an identified area of interest.
Figure 13:
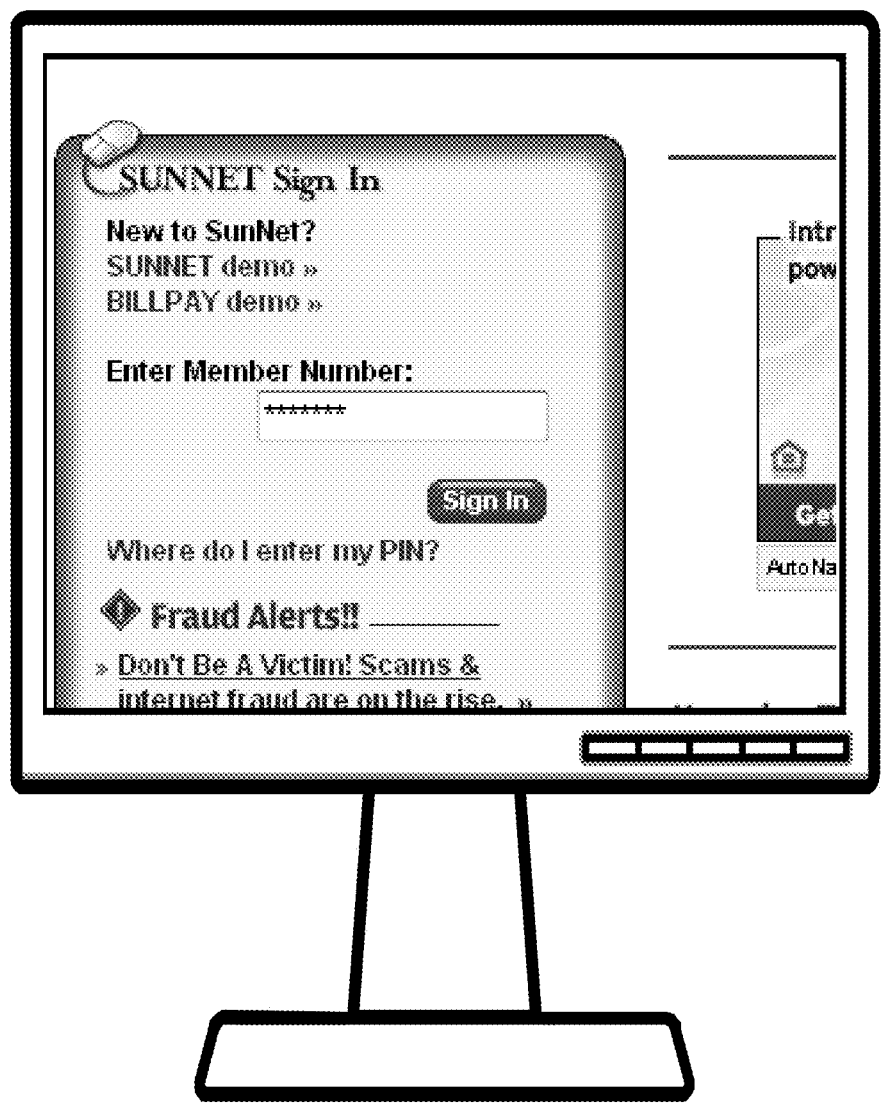
FIG. 13 is a second view in a sequence of two representative views of a predictive view function showing a magnified view of an area of interest to the user.

In FIG. 12 an online banking website is presented on a computer monitor with the area of interest to the low vision user identified by a magnifying glass graphic 120. At this point the screen magnification is not enabled. However, it should be noted that the end user always types in her member number in the textbox to initiate the login process. Prior to the present invention, screen magnification software would not take the user's past interaction into account which would force the low vision end user to repeatedly navigate to the textbox control field. This can be cumbersome for repetitive tasks. However, as shown in FIG. 13, upon the end user initiating magnification of the screen, the browser state, focus and URL are read by the screen magnification software which then automatically generates the view in FIG. 13. In an alternative embodiment of the invention, the screen magnification software automatically generates the view in FIG. 13 simply responsive to the browser navigating to that particular URL. In such case, the magnification invocation, magnification level, view and even the focus of the control are all automatically set by the screen magnification software without any end user interaction. For repetitive and necessary tasks this can drastically improve the efficiency of the computing experience for the low vision user.

Figure 14A:
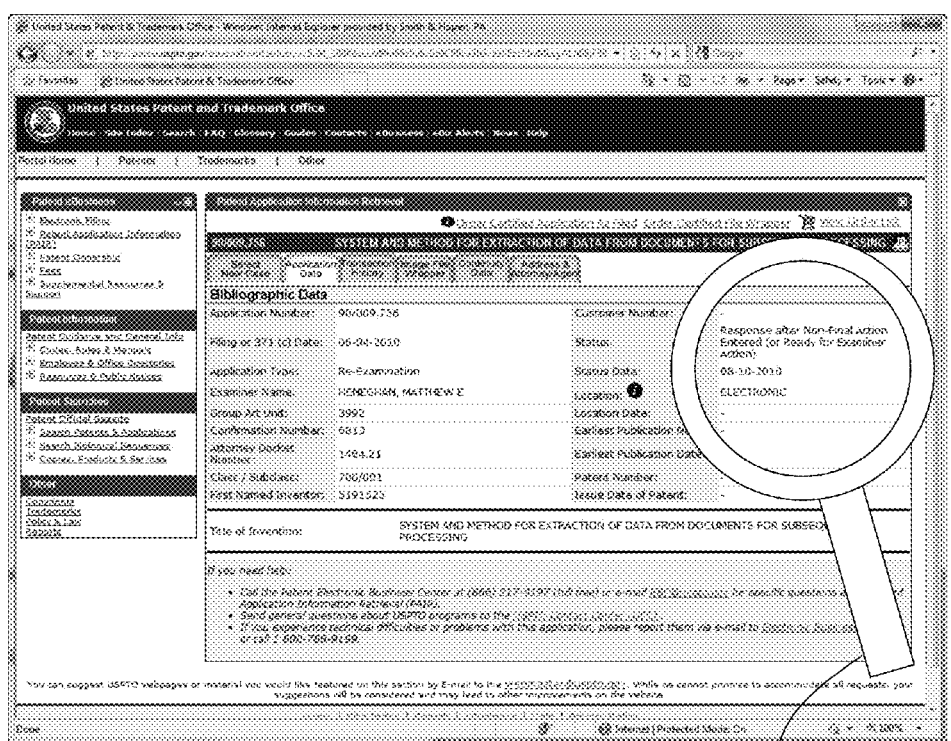
FIG. 14A is a first view in a sequence of two representative views of a predictive view function according to an embodiment of the invention, an unmagnified browser window is shown with an identified area of interest.
Figure 14B:
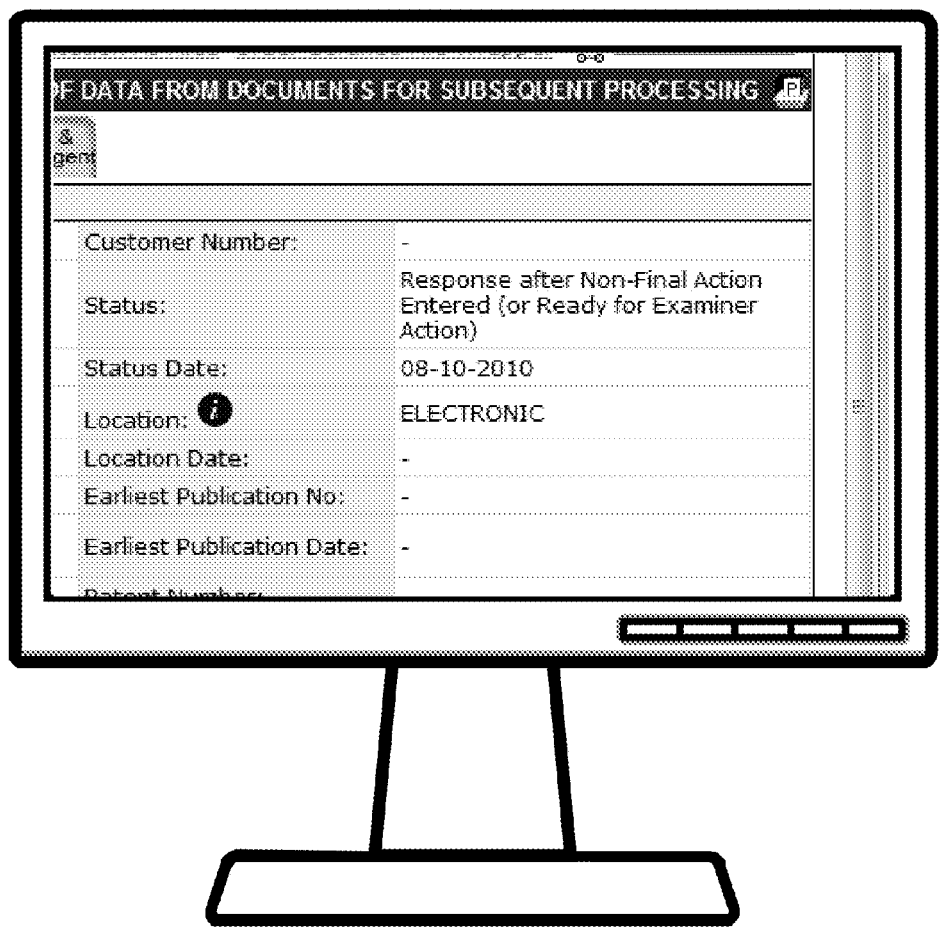
FIG. 14B is a second view in a sequence of two representative views of a predictive view function showing a magnified view of an area of interest to the user.
Figure 15A:
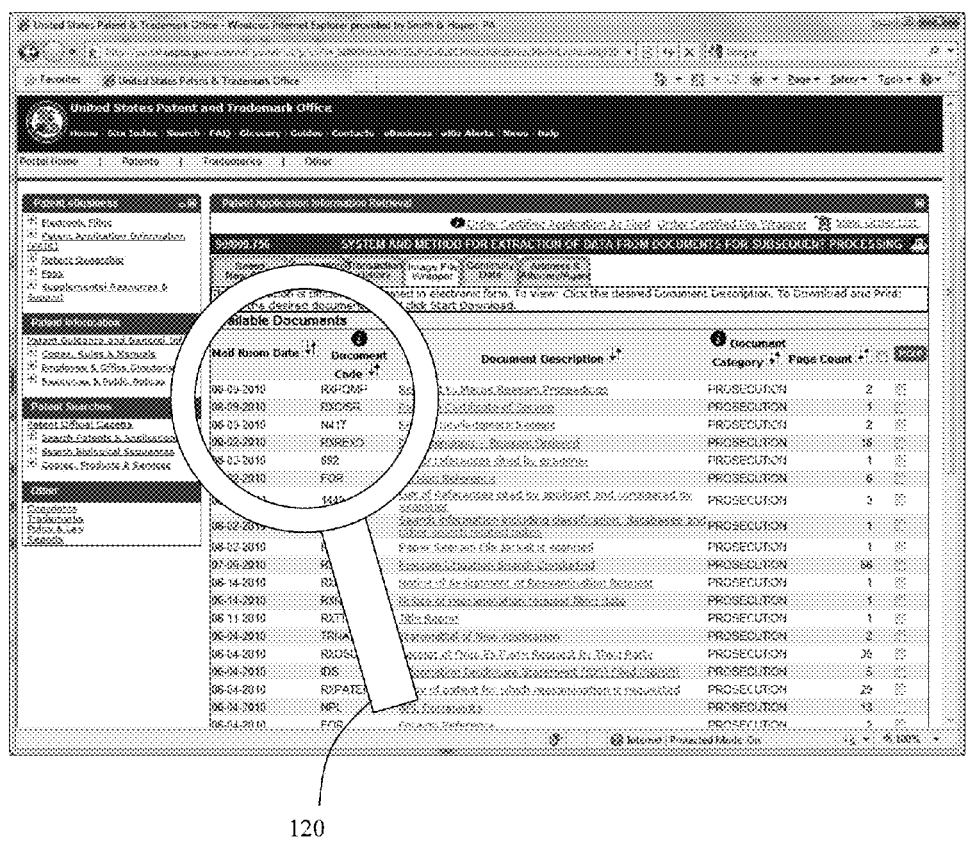
FIG. 15A is a first view in a sequence of two representative views of a predictive view function according to an embodiment of the invention, an unmagnified browser window is shown with an identified area of interest.
Figure 15B:
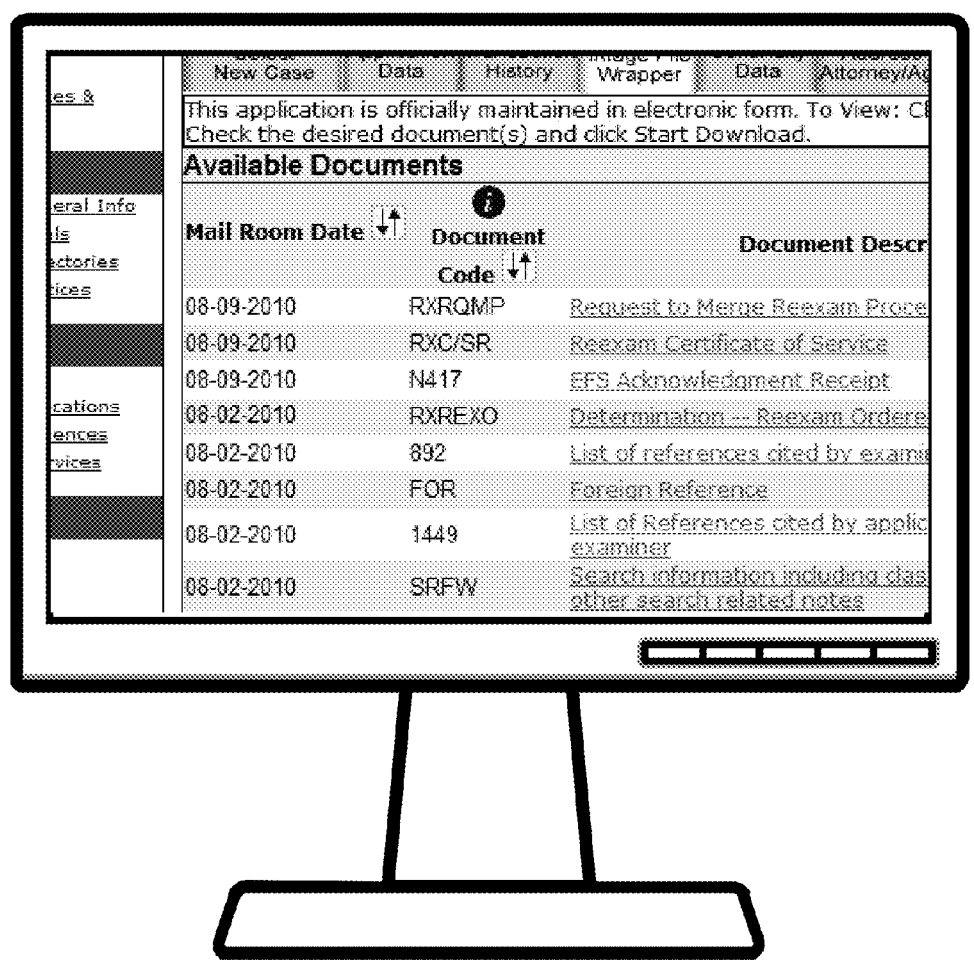
FIG. 15B is a second view in a sequence of two representative views of a predictive view function showing a magnified view of an area of interest to the user.
Figure 16A:
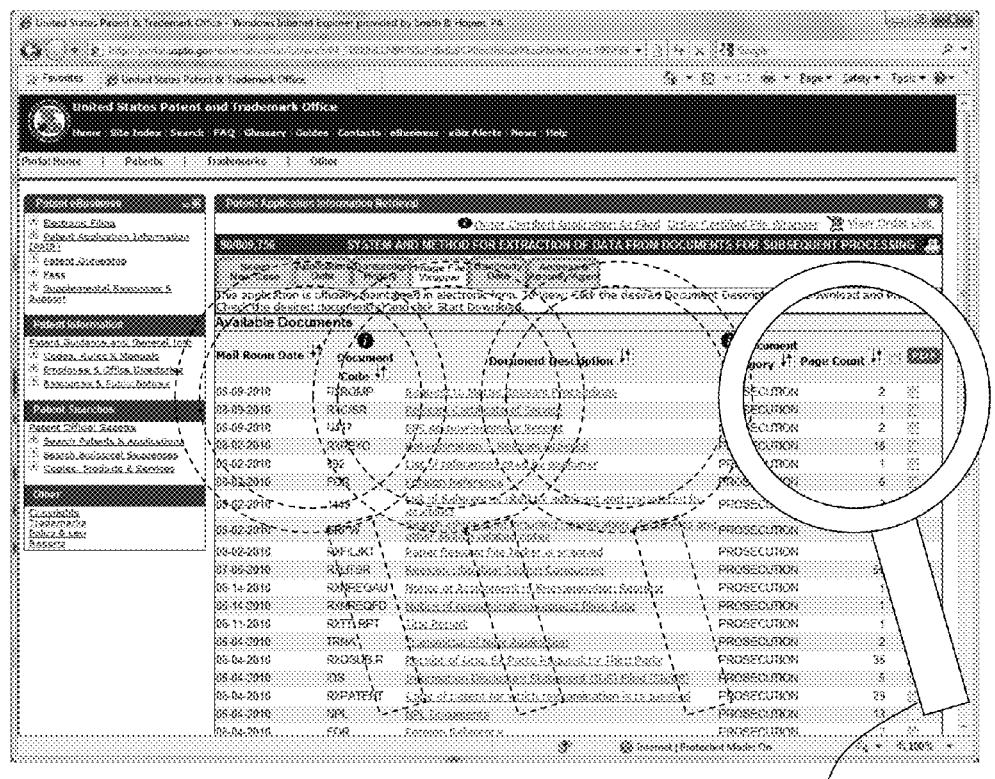
FIG. 16A is a first view in a sequence of two representative views of a predictive view function according to an embodiment of the invention, an unmagnified browser window is shown with an identified area of interest.
Figure 16B:
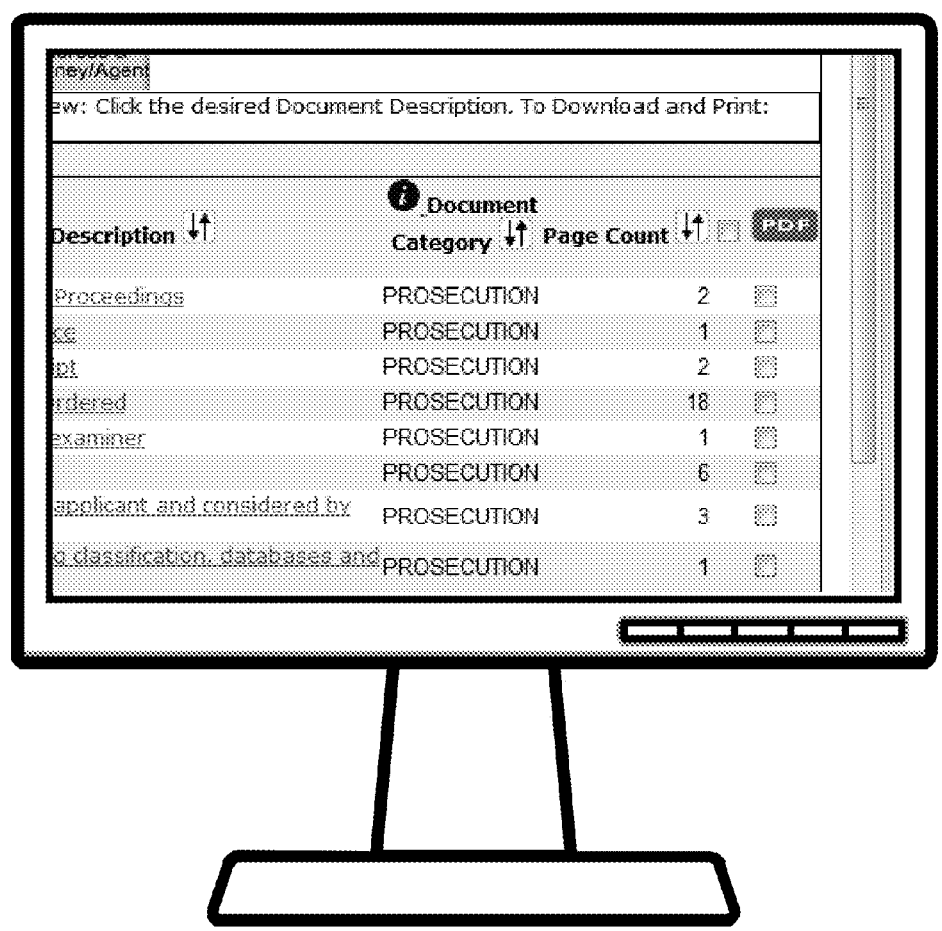
FIG. 16B is a second view in a sequence of two representative views of a predictive view function showing a magnified view of an area of interest to the user.

Turning now to FIG. 14A, a low vision user checking the status of case pending before the U.S. Patent & Trademark Office prefers to go immediately to the center right side of the "Application Data" report which gives a status text string and a status date. This area is identified in FIG. 14A by a magnifying glass graphic 120. However, the area, when magnified appears as in FIG. 14B (i.e., the "view"). This view is automatically invoked responsive to the user entering in the case identifier (a control number is this example). The user typically only needs about five (5) seconds to assimilate this information before proceeding to a different tab on the graphic user information to check the image file wrapper. However, the six (6) tabs viewable without magnification in FIG. 14A are outside the viewable area in FIG. 14B. An embodiment of the present invention, either by monitoring past end user interaction or by manual invocation, automatically sends the necessary response to the browser to display the Image File Wrapper tab which is shown unmagnified in FIG. 15A. The end user initially examines the most recent mail room date as identified by the magnifying glass graphic 120. A magnified view is shown in FIG. 15B. However, the end user, by past and repeated activity, scrolls slowly from left to right to view the top line of the available documents. An embodiment of the invention as shown in FIG. 16A (unmagnified) scrolls the magnified view at a predetermined speed automatically based on the end user's prior activity monitored by the screen magnification software and ends up with a static view at the position shown by the non-hatched magnifying glass 120. The magnified view is shown in FIG. 16B.

Claim Term Glossary:

Boundaries are the edges of a rectangular view. The boundaries of a view include an upper, lower, right and left boundary.

Computer includes any computing device capable of running the software. In the context of the present invention, this would be any computer capable of rendering a graphic user interface and displaying a magnified view thereof to an end-user.

Computer Readable Media includes software embodied in a distributable package including, but not limited magnetic media, optical media and network-accessible digital distribution.

Control Object is an element on the graphic user interface that accepts some form of end user input. Examples of control objects include, but are not limited to, text forms, drop down lists, list boxes, radio buttons, check boxes and hyperlinks.

Document for the purposes of this specification includes any content-based application including a web page, word processing document or portable document format reference (e.g., ADOBE ACROBAT).

End User is a human being that utilizes the functionality of the computer software as opposed to a developer who authors the functionality of the computer software.

Focus is a property of a software application or control within a software application that makes it active or otherwise available for immediate interaction. For example, when a web browser application visits a search engine, code on the web server for that search engine will typically automatically put a caret (text insertion point indictor) into a form field box. This allows the end user to immediately start typing out his or her search inquiry. Another example of focus is when moving through a series of form fields, the caret jumps to the next form after the user depresses a key such as "ENTER" or "TAB."

Graphic User Interface is the visual display presented to the end user that contains information and/or interactive controls for the end-user to utilize the functionality of the software. The graphic user interface may also be reviewed to as "the desktop" which may be presented on a single monitor or extended across a plurality of monitors. Typically, the monitors are placed side-by-side. When the pointing indicia (usually a caret or cursor) moves to the right edge of the left monitor it will "reappear" on the left edge of the right monitor.

Monitor is a display device which may include a cathode ray tube, LCD screen or the like. A plurality of monitors may be linked together to form a multi-monitor display. In a multi-monitor display, the information on one monitor may be redisplayed on a second monitor (or more monitors as connected). However, for the purposes of this disclosure, a multi-monitor display may be configured to extend the desktop area from one monitor to another. This permits a greater amount of information to be displayed to the end user simultaneously. A particular utility of a multi-monitor display is to present two separate applications side-by-side (a first software application on a first monitor and a second software application on a second monitor).

Panning (or scrolling) refers to the movement of a graphic user interface or desktop when under magnification. Panning incrementally moves (scrolls or tilts) the user's view across what is apparently a larger image that is not wholly seen.

Pointer Indicia is a caret or cursor visual element that moves about the graphic user interface typically in response to a peripheral device such as a mouse, track pad, touch-screen or the like.

Screen Magnification is the function of enlarging a portion of the graphic user interface, particularly for low-vision users. Screen magnification may be built into the operating system running on the computer (i.e., common brands include WINDOWS 7, ANDROID, LINUX) or may be a third party application run in concert with the operating system (i.e., MAGIC sold by Freedom Scientific, Inc.).

Software Program includes a sequence of instructions written to perform a specified task with a computer.

View is a magnified rectangular portion of the graphic user interface defined by the Cartesian Coordinates of its location with respect to the overall area of the graphic user interface.

View Locking according to the present invention is defined as invoking one or more boundaries in a magnified view and disabling the panning of that magnified view regardless of whether pointing indicia crosses one or more boundaries. View locking may also restrict the movement of the pointing indicia itself to within one or more boundaries. An embodiment of view locking on a single monitor graphic user interface may prohibit panning and/or movement of the pointing indicia outside the view across all four boundaries of a rectangular view. In a dual monitor embodiment, three of the four rectangular view boundaries are locked while a common boundary permits movement of the pointing indicia from one monitor to another. In a three-monitor embodiment, a middle monitor may have two boundaries "unlocked" so that the pointing indicia may traverse the middle monitor from the outside monitors.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

What is claimed is:

1. One or more non-transitory computer-readable media having computer-executable instructions for performing a method of running a software program on a computer, the computer operating under an operating system, the method including issuing instructions from the software program comprising:

magnifying a portion of a graphic user interface on a monitor to establish a magnified view, the magnified view defining a rectangle having an upper boundary, a lower boundary, a left boundary and a right boundary;

responsive to an end-user selectable setting, restricting pointer indicia movement to an area defined by the upper boundary, the lower boundary, the left boundary and the right boundary;

responsive to the end-user input, moving the pointer indicium about the magnified view, wherein the magnified view remains static irrespective of the pointer indicium movement;

saving an end-user selected view associated with a preselected application in focus;

monitoring the state of the graphic user interface for the reappearance of the preselected application; and automatically invoking the magnified view and restricting pointer indicia movement responsive to the preselected application coming into focus.

2. One or more non-transitory computer-readable media having computer-executable instructions for performing a method of running a software program on a computer, the computer operating under an operating system, the method including issuing instructions from the software program comprising:

magnifying a portion of a graphic user interface on a monitor to establish a magnified view, the magnified view defining a rectangle having an upper boundary, a lower boundary, a left boundary and a right boundary;

responsive to an end-user selectable setting, restricting pointer indicia movement to an area defined by the upper boundary, the lower boundary, the left boundary and the right boundary;

responsive to the end-user input, moving the pointer indicium about the magnified view, wherein the magnified view remains static irrespective of the pointer indicium movement;

saving an end-user selected view associated with a preselected document in focus; monitoring the state of the graphic user interface for the reappearance of the preselected document; and automatically invoking the magnified view and restricting pointer indicia movement responsive to the preselected document coming into focus.

3. One or more non-transitory computer-readable media having computer-executable instructions for performing a method of running a software program on a computer, the computer operating under an operating system, the method including issuing instructions from the software program comprising:

magnifying a portion of a graphic user interface on a monitor to establish a magnified view, the magnified view defining a rectangle having an upper boundary, a lower boundary, a left boundary and a right boundary;

responsive to an end-user selectable setting, restricting pointer indicia movement to an area defined by the upper boundary, the lower boundary, the left boundary and the right boundary;

responsive to the end-user input, moving the pointer indicium about the magnified view, wherein the magnified view remains static irrespective of the pointer indicium movement;

monitoring end-user magnification activity;

automatically saving an end-user selected view associated with a preselected application in focus; monitoring the state of the graphic user interface for the reappearance of the preselected application; and automatically invoking the magnified view and restricting pointer indicia movement responsive to the preselected application coming into focus.

4. One or more non-transitory computer-readable media having computer-executable instructions for performing a method of running a software program on a computer, the computer operating under an operating system, the method including issuing instructions from the software program comprising:

magnifying a portion of a graphic user interface on a monitor to establish a magnified view, the magnified view defining a rectangle having an upper boundary, a lower boundary, a left boundary and a right boundary;

responsive to an end-user selectable setting, restricting pointer indicia movement to an area defined by the upper boundary, the lower boundary, the left boundary and the right boundary;

responsive to the end-user input, moving the pointer indicium about the magnified view, wherein the magnified view remains static irrespective of the pointer indicium movement;

monitoring end-user magnification activity;

automatically saving an end-user selected view associated with a preselected document in focus; monitoring the state of the graphic user interface for the reappearance of the preselected document; and automatically invoking the magnified view and restricting pointer indicia movement responsive to the preselected document coming into focus.

* * * * *